United States Patent [19]

Tsuda

[11] 4,315,280
[45] Feb. 9, 1982

[54] METHOD FOR REPRODUCING COLOR SEPARATION PICTURES ON A RECORDING MATERIAL FROM ORIGINAL PICTURES

[75] Inventor: Masanori Tsuda, Kyoto, Japan

[73] Assignee: Dainippon Screen Seizo Kabushiki Kaishi, Kyoto, Japan

[21] Appl. No.: 133,588

[22] Filed: Mar. 24, 1980

[30] Foreign Application Priority Data

Apr. 13, 1979 [JP] Japan .................................. 54-44216

[51] Int. Cl.³ .............................................. G03F 3/00
[52] U.S. Cl. .................................................... 358/80
[58] Field of Search .......................................... 358/80

[56] References Cited

U.S. PATENT DOCUMENTS 4,060,829  11/1977  Sakamoto .............................. 358/80

*Primary Examiner*—Robert L. Richardson
*Attorney, Agent, or Firm*—Lackenbach, Siegel, Marzullo, Presta & Aronson

[57] ABSTRACT

A method for reproducing color separation pictures on a recording material from original pictures, wherein each original picture is color-separated and color-corrected to obtain color separation picture signals of primary colors such as yellow, magenta, cyan and black, which are stored in a memory, and wherein according to the color separation picture signals read out of the memory each color separation picture is reproduced in one of recording sub-areas of each recording area which is divided into the sub-areas of the corresponding number to the original pictures.

3 Claims, 3 Drawing Figures

METHOD FOR REPRODUCING COLOR SEPARATION PICTURES ON A RECORDING MATERIAL FROM ORIGINAL PICTURES

BACKGROUND OF THE INVENTION

This invention relates to a method for reproducing color separation pictures on a recording film from original pictures, for making color separation printing plates.

In a conventional color scanner, an original color picture is color-separated and color-corrected to obtain color separation picture signals of primary colors such as yellow, magenta, cyan and black, and then the color separation picture signals obtained are stored in a memory. Then the color separation picture signals are read out of the memory, and color separation pictures of the original picture for making color separation printing plates are reproduced on a recording film in its predetermined division areas by using the color separation picture signals.

When the color separation pictures are reproduced in the recording film secured to a recording cylinder, the recording film is covered by a halftone contact screen consisting of four halftone screens with different screen angles for four color inks such as yellow, magenta, cyan and black. The position of the halftone contact screen is properly adjusted on the recording cylinder so that the four halftone screens may exactly be positioned in the predetermined positions. Thus, in practice, it is difficult to change the size of the halftone contact screen, and the size of the recording film is limited depending on the size of the halftone contact screen.

Accordingly, in this case, even if a small original picture is reproduced in the recording film, the recording film still having a space for the reproduction must be processed, which is uneconomical. Further, the recording film exchange operation is carried out carefully in a darkroom by skilled operators, and involves more careful removal and reset operations of the halftone contact screen. In such operations the halftone contact screen is apt to be damaged. Hence, such a film exchange operation should be reduced.

In this embodiment, however, in general, a plurality of original pictures of small size cannot be processed in a single operation, i.e. the color separation reproduction pictures of the plurality of original pictures cannot be recorded on the same recording film because the color correction conditions of each original picture are properly varied depending on the nature of the original picture.

SUMMARY OF THE INVENTION

It is an object of the present invention to provide a method for reproducing color separation pictures on a recording film from original pictures free from the aforementioned defects, which is capable of a quick and reliable operation.

According to the present invention there is provided a method for reproducing color separation pictures on a recording material from original pictures, wherein an original picture is color-separated and color-corrected to obtain color separation picture signals of primary colors, and then the color separation picture signals obtained are stored in a memory, and wherein color separation pictures of the original picture are reproduced in recording areas corresponding to the primary colors on a recording material according to the color separation picture signals read out of the memory, characterized in that each recording area is divided into recording sub-areas in which color separation pictures of one color of the original pictures are reproduced.

BRIEF DESCRIPTION OF DRAWINGS

In order that the present invention may be better understood, a preferred embodiment thereof will be described with reference to the accompanying drawings, in which.

DESCRIPTION OF A PREFERRED EMBODIMENT

Figure 1:
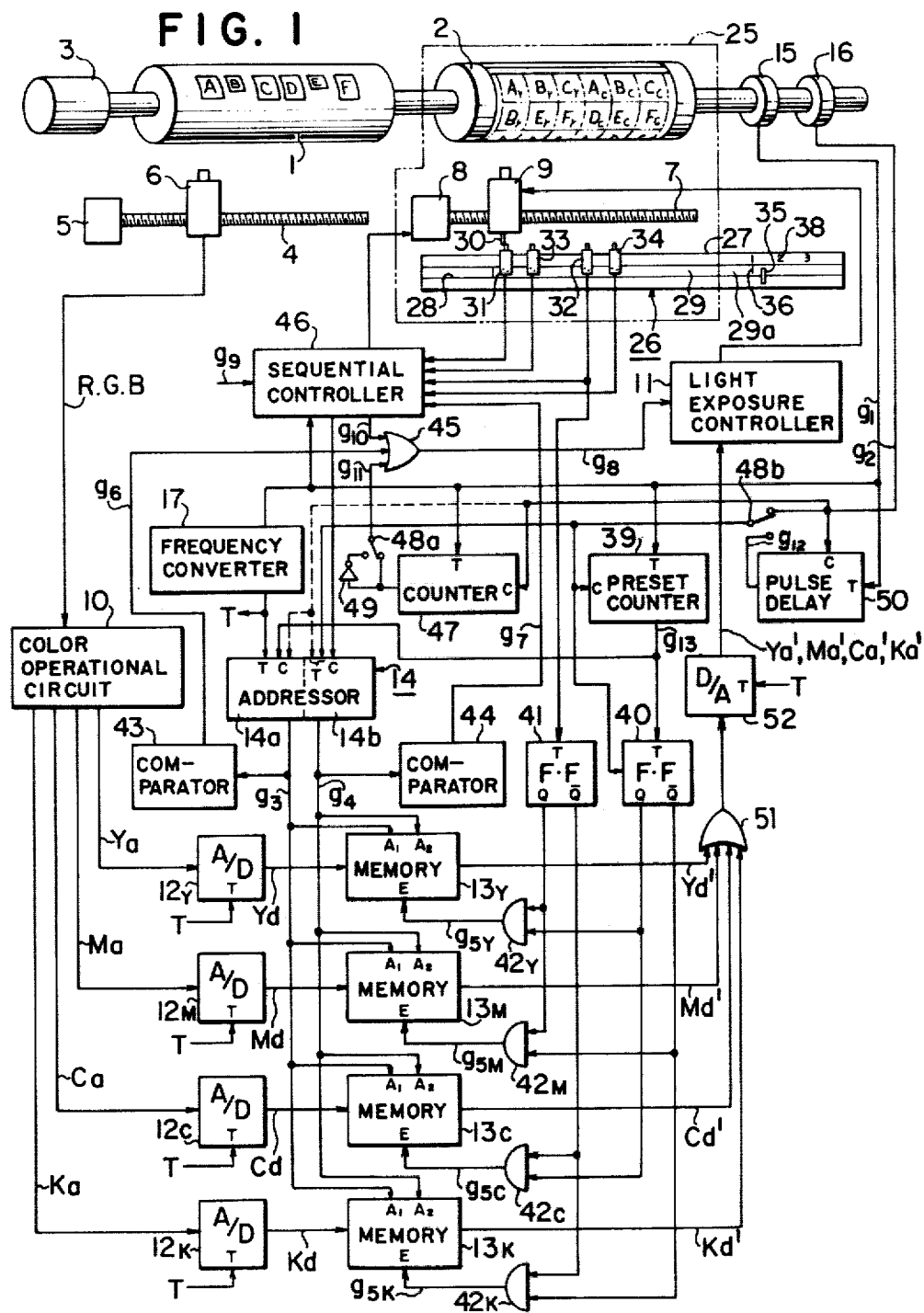
FIG. 1 is a schematic view of a color scanner carrying out the method according to the present invention.

Referring now to the drawings, there is shown in FIG. 1 a color scanner carrying out the method for reproducing color separation pictures on a recording film from original pictures, according to the present invention.

A picture cylinder 1 and a recording cylinder 2 are coaxially arranged and are driven at the same time by a motor 3. Each of the original pictures secured to the picture cylinder 1 is scanned by a pickup head 6 which is moved by a motor 5 along a screw rod 4 which is arranged in parallel with the axis of the picture cylinder 1. A recording film secured to the recording cylinder 2 is exposed by a recording head 9 which is moved by a motor 8 along a screw rod 7 which is arranged in parallel with the axis of the recording cylinder 2.

The pickup head 6 scans the original picture mounted on the picture cylinder 1 in the direction of the cylinder's periphery (hereinafter referred to as "first scanning" direction), and the direction of the cylinder's axis (hereinafter referred to as "second scanning" direction) to pick up a picture signal and then the picture signal is separated into analog color separation picture signals R, G and B of additive primary colors such as red, green and blue in a color separator included in the pickup head 6.

The color separation signals R, G and B are sent to a color operational circuit 10 in which the color separation signals R, G and B are color-corrected, and the circuit 10 outputs color-corrected analog color separation picture signals Ya, Ma, Ca and Ka corresponding to color inks such as yellow Y, magenta M, cyan C and black K. The color correction operation is carried out in such a manner that each color separation picture may be recorded on the recording film by the recording head 9 when each color-corrected signal Ya, Ma, Ca or Ka is fed in a light exposure controller 11 for the recording head 9.

Each color-corrected analog signal Ya, Ma, Ca or Ka is sent to an analog-digital converter 12Y, 12M, 12C or 12K and is converted there into a digital picture signal Yd, Md, Cd or Kd having necessary bits by sampling the signal Ya, Ma, Ca or Ka in synchronization with a clock pulse T having a necessary resolving power.

Each digital picture signals Yd, Md, Cd or Kd is sent to a memory 13Y, 13M, 13C or 13K and is stored there in the same addresses in the first and the second scanning directions by addressing by means of first and second scanning address signals g3 and g4 which are generated by first and second scanning address circuits 14a and 14b which compose an addressor circuit 14. The first and the second address circuits 14a and 14b generate the address signals g3 and g4 in synchronization with timing pulses g1 and g2 which are generated from a timing pulse generator 15 and a one-rotation pulse generator 16 which are coaxially arranged with the picture and the recording cylinders 1 and 2.

The timing pulse generator 15 outputs approximately one thousand timing pulses g1 per one rotation. The timing pulse g1 is sent to a frequency converter 17 comprising a phase-lock loop circuit, and so forth, which generates the clock pulse T having a frequency, usually 5–20 times as large as that of the pulse g1, corresponding to the resolving power in the first scanning direction.

The clock pulse T is fed to the first scanning address circuit 14a and the address number of the first scanning address signal g3 is increased one by one per one clock pulse T and is cleared by the one-rotation pulse g2 from the one-rotation pulse generator 16. The address number of the second scanning address signal g4 generated from the second address circuit 14b is increased one by one per a one-rotation pulse g2 and is cleared when the scanning of the next picture is initiated.

In the writing mode of the picture signals into the memories the one-rotation pulse g2 is fed to the first and the second scanning address circuits 14a and 14b, as shown by broken lines in FIG. 1.

Each memory 13Y, 13M, 13C or 13K includes a plurality of memory blocks, each having an address space corresponding to one first scanning line and being selected by the second scanning address signals g4. The addresses of the memory block is addressed by the first scanning address signal g3.

Hence, when the one-rotation pulse g2 is fed in the addressor circuit 14, The digital color signals Yd, Md, Cd and Kd are consecutively stored in the memory blocks from the first address, each memory block being selected by the second scanning address signal g4. The memory blocks into which the digital color signals Yd, Md, Cd or Kd are stored are changed one by one by the one-rotation pulse g2.

The device as described thus far is the same as the conventional color scanner having the memories and accordingly the detail explanation thereof may be omitted for the simplicity of the description.

In a conventional color scanner, two different recording methods are utilized according to the read-out timings of the picture signals from the memories 13Y, 13M, 13C and 13K.

In one method, while the recording cylinder 2 is turned once, each memory 13Y, 13M, 13C or 13K reads out consecutively the picture signals corresponding to one first scanning line so as to reproduce consecutively a row of four color separation pictures on the recording film in the first scanning direction by using one recording head.

In the other method, while the recording cylinder 2 is turned once, each pair of memories 13Y and 13M or 13C and 13K read out consecutively the picture signals corresponding to one first scanning line so as to reproduce consecutively two rows of four color separation pictures on the recording film by using two recording heads which are separated at a proper distance from each other.

However, in both the methods, the sizes and the positions of the four halftone screens of the halftone contact screen are predetermined depending on the read-out timings of the picture signals from the memories 13Y, 13M, 13C and 13K, and therefore it is inconvenient to process a small picture.

Further, in the first method, since the four color separation reproduction pictures are aligned in a row in the first scanning direction, the diameter of the recording cylinder must be enlarged. In the second method, the photoelectric characteristics of the two recording heads used must be adjusted for a long period of time, which is, in practice, rather difficult. According to the present invention these problems can be removed.

Before commencing the description of the recording method according to the present invention, the relation between the positions of the original pictures and the color separation reproduction pictures will be described in connection with FIG. 2.

Figure 2:
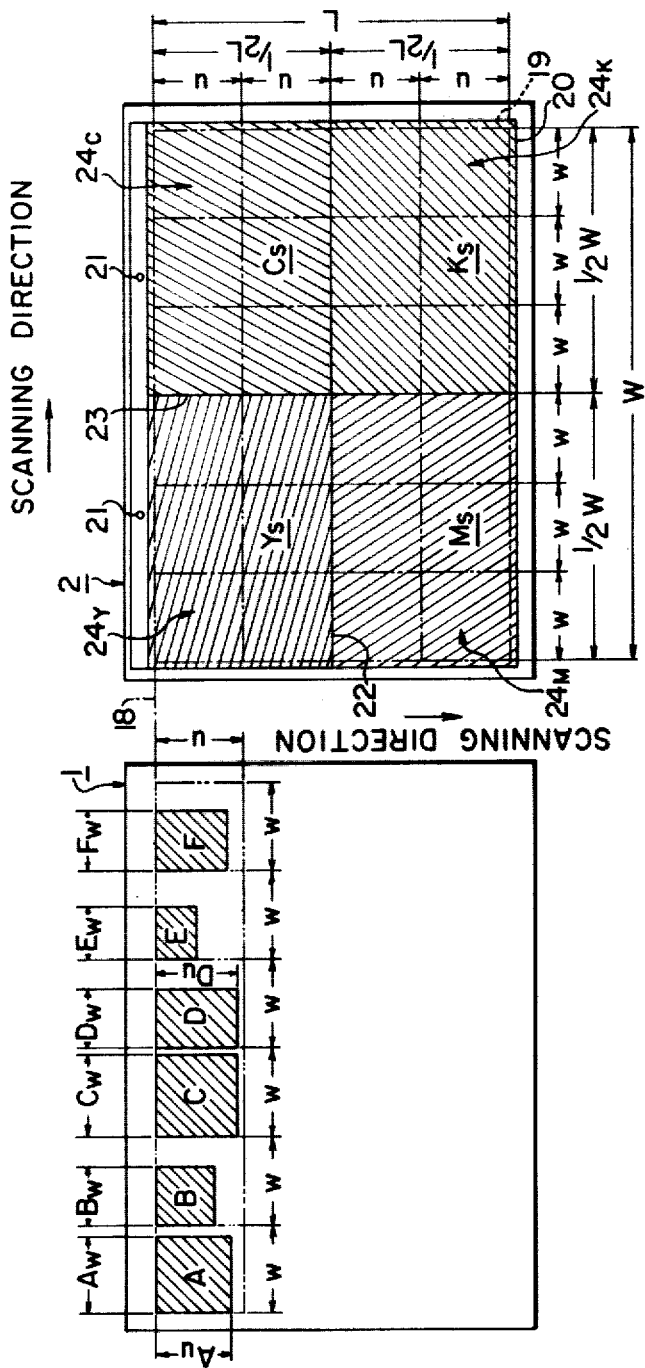
FIG. 2 is an exploded view of picture and recording cylinders together with original pictures, a recording film and a halftone contact screen which are mounted thereon, in FIG. 1.

In FIG. 2, there are shown the picture and the recording cylinders 1 and 2, which are exploded and arranged side by side with respect to a standard line 18 on which the one-rotation pulse g2 is generated by the pulse generator 16. On the picture cylinder 1 six original pictures A, B, C, D, E and F are aligned in the second scanning direction. On the recording cylinder 2, a recording film 19 and a halftone contact screen 20 on it are mounted with respect to register pins 21. The halftone contact screen 20 consists of two pairs of halftone screens Ys, Ms, Cs and Ks with different screen angles for four color inks such as yellow, magenta, cyan and black.

The sizes of the recording film 19 and the contact screen 20 are at least the same as the maximum recording area in a rectangular form having the maximum effective first scanning length L and the maximum effective second scanning width W.

The maximum recording area L×W is divided into four equal color separation recording areas 24Y, 24M, 24C and 24K for the color inks Y, M, C and K by horizontal and vertical center lines 22 and 23 which are the border lines between the two of the halftone screens Ys, Ms, Cs and Ks.

In this embodiment each color separation recording area 24Y, 24M, 24C or 24K is further divided into six (three upper and three lower) equal color separation recording sub-areas corresponding to six small original pictures A, B, C, D, E and F secured to the picture cylinder 1. Thus, each color separation recording sub-area has a rectangular form having a length $u = \frac{1}{2}L$, and a width $w = 1/6W$, and the size of the color separation recording sub-area is larger than the size of each original picture A, B, C, D, E or F, each having a length Au, Bu, Cu, Du, Eu or Fu and a width Aw, Bw, Cw, Dw, Ew or Fw.

If the magnification is varied, the changed size of the picture is should be smaller than the color separation recording sub-area.

The color separation pictures of each original picture A, B, C, D, E or F are successively recorded in the color separation recording sub-areas predetermined of each color separation recording areas 24Y, 24M, 24C or 24K as follows.

As shown in FIG. 1, the recording cylinder 2 and the recording head 9 are included in a dark box 25 which is shown by two-dotted lines. A position detector 26 for detecting the position of the recording head 9 in the second scanning direction is also included in the dark box 25, and comprises a guide base 27 having a guide groove 28 along it, which secured to the frame of the scanner in parallel with the screw rod 7, and part of which is projected from the dark box 25, and a slide member 29 which is movable along the guide groove 28 and on which four actuating switches 31–34, the former two 31 and 32 for starting the scanning operation, and the latter two 33 and 34 for stopping the same, are mounted in their predetermined positions. Each actuating switch 31, 32, 33 or 34 cooperates with an actuator 30 attached to the rear end of the recording head 9.

The pair of switches 31 and 32 or 33 and 34 are separated each other at a distance $\frac{1}{2}W$ in the second scanning direction. Between the switches 31 and 33 or 32 and 34 is away at a distance w which is the same width as that of the color separation recording sub-area in the second scanning direction. The positions of the switches 33 and 34 are adapted to be adjustable depending on the width w of the sub-area.

The slide member 29 is provided with a handle 35 and an arrow 36 for positioning it in its right hand side end portion 29a. The guide base 27 is provided with a number scale 38, i.e. 1, 2 and 3, in its right hand side end, which are aligned at the distance w in the second scanning direction. Therefore, if the arrow 36 is set to the scale number 1, 2 or 3 in order to select first, second or third one (from the left hand side) of the three color separation recording sub-areas aligned in the second scanning direction, each pair of switches 31 and 33 or 32 and 34 are aligned along both the vertical border lines of first, second or third recording sub-areas of the recording areas 24Y and 24M or 24C and 24K. After setting of the arrow 36 to one of the scale numbers 1, 2 and 3, the slide member 29 is fixed.

Figure 3:
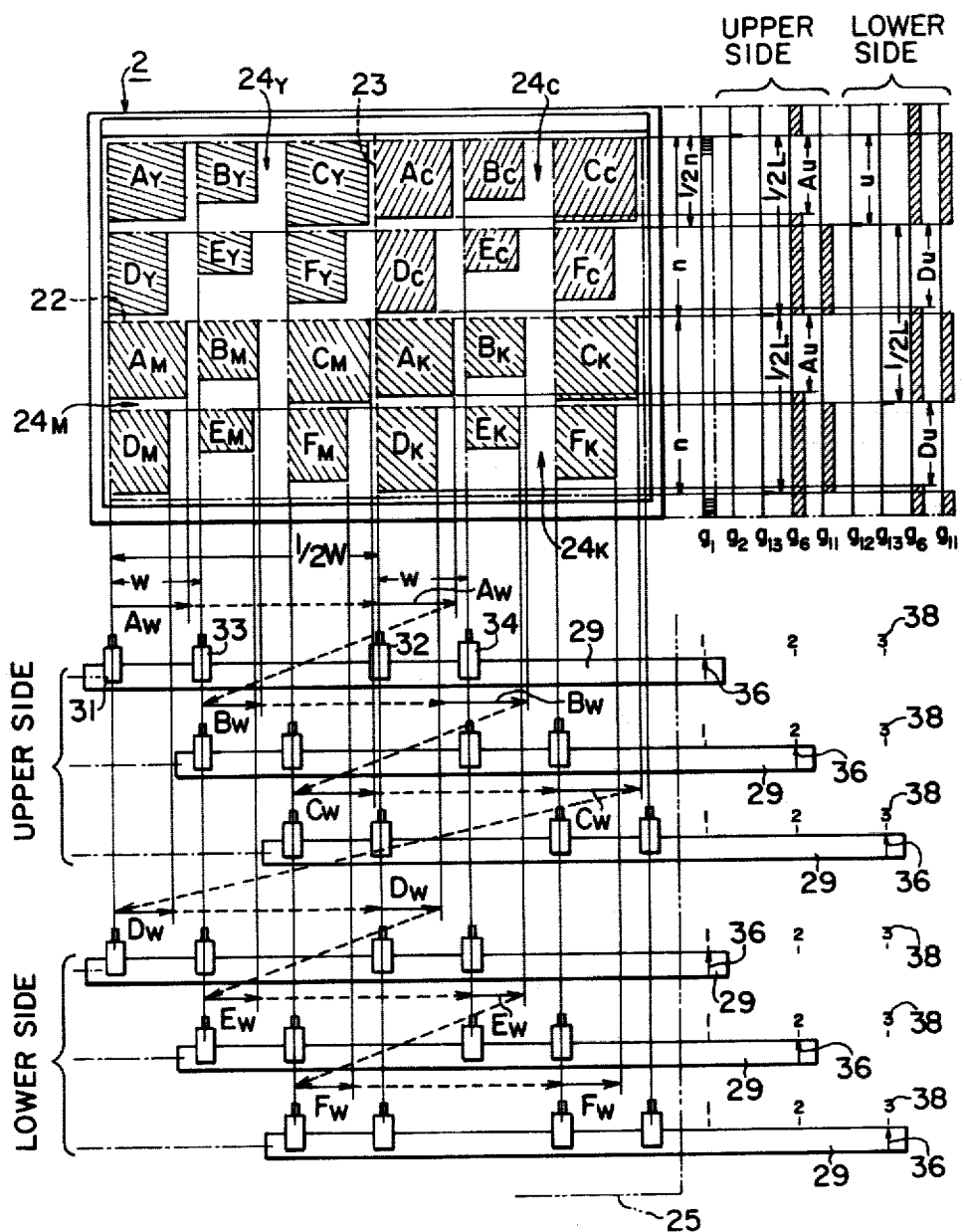
FIG. 3 is a schematic view, partly exploded, of color separation pictures in a recording film on a halftone screen, mounted on a recording cylinder, timing pulse positions, and switches for detecting scanning start and stop positions, shown in FIG. 1 for explaining the relation thereof.

Now, as shown in FIG. 3, for example, when the color separation pictures of the original picture A are recorded on the film 19, the arrow 36 of the slide member 29 is set to the scale number 1 of the guide base 27, as described above, so that each switch 31 or 32 may be adjusted on the line of the scanning starting position in the second scanning direction in the recording areas 24Y and 24M for yellow, and magenta or 24C and 24K for cyan and black.

In this case, the color separation pictures Ay and Am for yellow and magenta are first reproduced at the same time, and then the color separation pictures Ac and Ak for cyan and black are reproduced at the same time, as hereinafter described. The reading of the color signals Yd, Md, Cd and Kd stored in the memories 13Y, 13M 13C and 13K is controlled by enable signals g5y, g5m, g5c and g5k which are sent from AND gates 42Y, 42M, 42C and 42K so that, when the recording head 9 is faces each recording area 24Y, 24M, 24C or 24K, the color signals Yd, Md, Cd or Kd may be read out of the memory 13Y, 13M, 13C or 13K by the address signals g3 and g4.

Each recording area 24Y, 24M, 24C or 24K or the halftone screen Ys, Ms, Cs or Ks is selected in the followings. That is, the upper or the lower halftone screens Ys and Cs or Ms and Ks are selected by detecting the horizontal border line 22 between the upper and the lower halftone screens, i.e. n numbers of the timing pulses g1 generated by the pulse generator 15 are counted in a preset counter 39 which is cleared by the one-rotation pulse g2, from the standard line 18 to the border line 22. Then, the preset counter 39 outputs a signal to a flip-flop 40, and then the upper or the lower halftone screens are selected depending on signals sent from the flip-flop 40. The preset counter 39 and the flip-flop 40 are cleared by the one-rotation pulse g2 at a moment.

The left or the right halftone screens Ys and Ms or Cs and Ks are selected by detecting the vertical border line 23 between the left and the right halftone screens, that is, the switch 32 detects the border line 23 and outputs a signal to a flip-flop 41, and depending on the signals output from the flip-flop 41 the left or the right halftone screens are selected.

Each flip-flop 40 or 41 sends one of the pair of output signals having different polarities to the AND gates 42Y, 42M, 42C and 42K, each outputting the enable signal g5y, g5m, g5c or g5k to the memories 13Y, 13M, 13C or 13K corresponding to the recording area 24Y, 24M, 24C or 24K while the recording head 9 scans.

In the recording mode, the addressor circuit 14 functions in the similar manner to the writing mode except that the first scanning address circuit 14a is cleared by the one-rotation pulse g2 and the output signal from the preset counter 39 when the preset counter 39 counts n numbers of the timing pulses g1, and that the second scanning address circuit 14b is cleared when the recording head 9 is actuated by the switch 32.

A pair of number comparators 43 and 44 are connected to the output lines of the first and the second scanning address circuits 14a and 14b. In the number comparators 43 and 44, first and second scanning address numbers corresponding to the length Au and the width Aw of the original picture A are preset, and, when the first and the second scanning address signals g3 and g4 become over the preset address numbers, overflow signals g6 and g7 are output. The preset address numbers are predetermined by calculating address numbers from the length and the width of the original picture, which are measured in advance.

The overflow signal g6 is fed from the number comparator 43 to an OR gate 45, and then the OR gate 45 outputs a blanking signal g8 to the light exposure controller 11 in order to intercept the light to the recording head 9 while the recording head 9 is out of the length Au of the picture A.

When the overflow signal g7 is sent from the number comparator 44 to a sequential controller 46, the sequential controller 46 outputs a blanking signal g10 to the OR gate 45 in order to intercept the light to the recording head 9 while the recording head 9 is out of the length Aw of the picture A, and in the same time the recording head 9 is quickly moved in the second scanning direction until the actuator 30 thereof actuates the switch 32.

The actuating signals output from the switches 13–34 are fed to the sequential controller 46, and then it controls sequentially the motor 8 for the recording head 9 such as starting, stopping, returning, quick driving, and so forth. The sequential controller 46 is started by a start signal g9 generated by a manual switch.

To the OR gate 45 is fed another blanking signal g11 output by a base-$\frac{1}{2}$n counter 47 in order to intercept the light to the recording head 9 when the recording head 9 is positioned in the lower or the upper recording sub-areas in the recording area 24Y, 24M, 24C or 24K, that is, it selects the upper or the lower recording sub-areas in the recording area.

The counter 47 counts the number of the timing pulses g1 and is cleared by the one-rotation pulse g2. In the counter 47, ½n corresponds to the length u of the recording sub-area in the recording area. The blanking signal g11 is so obtained that, when the upper recording sub-areas are selected, the output signal from the counter 47 may be directly fed to the OR gate 45 as the blanking signal g11, but when the lower recording sub-areas are selected, the output signal from the counter 47 may be passed through an inverter 49 by a turn switch 48a in order to invert its phase, and is then fed to the OR gate 45 as the blanking signal g11.

A turn switch 48b is ganged with the turn switch 48a. When the lower recording sub-areas are selected, the switch 48b is turned so that the one-rotation pulse g1 may be sent to a pulse delay 50 in which the pulse g1 is delayed by a time corresponding to ½n pulses, and the pulse delay 50 outputs a delay pulse signal g12 to the preset counter 39, the flip-flop 40 and the second scanning address circuit 14b.

Accordingly, since the preset counter 39 is cleared ½n pulses late by the delay pulse g12, the preset counter 39 clears the first scanning address circuit 14a ½n pulses late and thus the read-out timing of the first scanning address circuit 14a is delayed by the time corresponding to the ½n pulses g1 so as to be synchronous with the lower recording sub-area.

Each digital recording signal Yd', Md', Cd' or Kd' is read out of the memory 13Y, 13M, 13C or 13K by the enable signal g5y, g5m, g5c or g5k, and then is sent to a digital-analog converter 52 through an OR gate 51. In the digital-analog converter 52 each digital recording signal Yd', Md', Cd' or Kd' is converted into an analog recording signal Ya', Ma', Ca' or Ka' in synchronization with the clock pulse T from the frequency controller 17. Then, each analog recording signal Ya', Ma', Ca' or Ka' is sent to the light exposure controller 11 which controls the exposure light so that the recording head 9 may record the color separation reproduction picture for yellow, magenta, cyan or black in the predetermined position of the recording film.

The recording operation will be described in connection with FIGS. 1 and 3, according to the present invention.

When the original picture A is recorded, first, the color separation picture signals Yd, Md, Cd and Kd obtained by scanning the original picture A are stored in the memories 13Y, 13M, 13C and 13K. The gang switches 48a and 48b are turned so that the upper recording sub-areas of the recording areas may be selected, as described above.

The arrow 36 of the slide member 29 is set to the scale number 1 on the guide base 27, so that the two pairs of switches 31 and 33; and 32 and 34 are aligned on both the vertical border lines of the first recording sub-areas of the recording areas 24Y and 24M; and 24C and 24K. Then, the length Au and the width Aw of the picture A are set to the number comparators 43 and 44. The operator inputs the start signal g9 into the sequential controller 46 to start the scanning operation.

The sequential controller 46 moves the recording head 9 in a quick manner until the actuator 30 actuates the scanning start switch 31. Then, the first and the second scanning address circuits 14a and 14b are cleared in a moment, and the first and the second scannings are started.

While the recording head 9 is moved between the switches 31 and 33, the flip-flops 40 and 41 output the signals to the AND gates so that the AND gates 42Y and 42M may consecutively send the enable signals g5y and g5m to the memories 13Y and 13M, and thus the picture recording signals Yd' and Md' are consecutively read out of the memories 13Y and 13M by the address signals g3 and g4 from the address circuits 14a and 14b, and then are sent to the light exposure controller 11 via the OR gate 51 and the digital-analog converter 52.

The yellow and the magenta color separation pictures Ay and Am, as shown in FIG. 3, are recorded on the recording film 19 secured to the recording cylinder 2 according to the picture recording signals Ya' and Ma', as described above. In this occasion the recording of the magenta color separation picture Am is delayed by the time corresponding to the n timing pulses g1, as described above.

When the switch 33 is actuated by the actuator 30 of the recording head 9, or the comparator 44 outputs the overflow signal g7 prior to the actuation of the switch 33 by the actuator 30, the recording head 9 is moved quickly in the second scanning direction until the switch 32 is actuated by the actuator 30, while the sequential controller 46 sends the blanking signal g10 to the OR gate 45 in order to intercept the light to the recording head 9, as shown in FIG. 3.

When the switch 32 is switched on, the first and the second scanning address circuits 14a and 14b are cleared in a moment in the same manner as described above, and between the switches 33 and 34 the cyan and the black color separation pictures Ac and Ak are recorded in the same manner as described above. When the switch 34 is actuated by the actuator 30 of the recording head 9 or the comparator 44 outputs the overflow signal g7 prior to the actuation of the switch 33, the sequential controller 46 is stopped, thereby finishing the reproduction of the color separation pictures Ay, Am, Ac and Ak of the original picture A on the recording film 19.

Next, the original picture B is recorded. The color separation picture signals Yd, Md, Cd and Kd of the original picture B are stored in the memories 13Y, 13M, 13C and 13K in the same manner as in the case of the original picture A described above.

The arrow 36 of the slide member 29 is set manually to the scale number 2 on the guide base 27, so that the two pairs of switches 31 and 33; and 32 and 34 may be aligned along both the vertical border lines of the second recording sub-areas of the recording areas. The the length Bu and the width Bw of the picture B are settled in the number comparators 43 and 44.

When the start signal g9 is input into the sequential circuit 46, the recording operation of the color separation pictures By, Bm, Bc and Bk of the picture B are carried out in the similar manner to the case of the picture A described above.

Then, the original picture C is recorded. The color separation picture signals of the original picture C are stored in the memories in the same manner as described above.

The arrow 36 of the slide member 29 is set to the scale number 3 on the guide base 27 and the two pairs of switches 31 and 33; and 32 and 34 are aligned on the vertical border lines of the third recording sub-areas of the recording areas. Then the length Cu and the width Cw of the picture C are settled in the number comparators 43 and 44.

Then, the recording operation of the color separation pictures Cy, Cm, Cc and Ck of the picture C are performed in the similar manner to the ones described above.

Then, the original pictures D, E and F are consecutively reproduced in the same manner as described above, except that the gang switches 48a and 48b are turned so that the lower recording sub-areas of the recording areas may be selected, as described above, thereby finishing all of the reproducing operations of the original pictures A, B, C, D, E and F.

In this embodiment described above, each memory 13Y, 13M, 13C or 13K has a capacity for storing one color separation recording sub-area, but this method may practically be carried out by a scanner of a real-time processing type, which is provided with memories, each having a capacity for storing at least two first scanning lines.

In this embodiment, the pulse generator 15 or 16 comprises a rotary encoder, but another conventional means may be used. The scanning start and stop positions may be detected by a rotary encoder which can be attached to the motor 8, or a linear encoder which may be arranged in parallel with the screw rod 7, instead of the switches 31, 32, 33 and 34.

Although the present invention has been shown and described in terms of a preferred embodiment, however, various changes and modifications can be made by a person skilled in the art without departing from the scope of the present invention.

What is claimed is:

1. A method for reproducing color separation pictures on a recording material from original pictures, wherein an original picture is color-separated and color-corrected to obtain color separation picture signals of primary colors, and then said color separation picture signals obtained are stored in a memory, and when color separation pictures of the original picture are reproduced in recording areas to which each of color inks is allocated corresponding to the primary colors or a reproducing material according to the other separation picture signals read out of said memory, characterized by comprising the following steps:
   dividing said recording areas into a number of recording sub-areas corresponding to the number of original pictures;
   allocating the original pictures to said sub-areas; and
   recording each of said color separation printing plates obtained by scanning each of said original pictures on said respective allocated sub-areas.

2. A method as claimed in claim 1, wherein each recording area is divided into said recording sub-areas of the corresponding number to the original pictures by detecting positions in directions of a recording cylinder's periphery and axis by detector means.

3. A method as claimed in claim 2, wherein said detector means in the direction of the periphery of the recording cylinder is a rotary encoder, and said detector means in the direction of the recording cylinder's axis is switches.

* * * * *